United States Patent
Hare, Jr.

(10) Patent No.: US 8,958,533 B1
(45) Date of Patent: *Feb. 17, 2015

(54) RESTRICTING USE OF AN ENDPOINT LINE TO FAX-ONLY

(75) Inventor: William C. Hare, Jr., Cumming, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/550,894

(22) Filed: Jul. 17, 2012

Related U.S. Application Data

(63) Continuation of application No. 11/961,898, filed on Dec. 20, 2007, now Pat. No. 8,223,934.

(60) Provisional application No. 60/877,277, filed on Dec. 27, 2006.

(51) Int. Cl.
*H04M 11/00* (2006.01)

(52) U.S. Cl.
CPC .................................... *H04M 11/00* (2013.01)
USPC ..................................................... 379/100.14

(58) Field of Classification Search
CPC .......................... H04M 11/00; H04M 11/066
USPC .......... 379/90.01, 93.01, 93.02, 93.05, 93.06, 379/100.01–100.16
See application file for complete search history.

(56) References Cited

U.S. PATENT DOCUMENTS

2003/0206563 A1* 11/2003 Lazarus et al. ................ 370/526
2006/0182264 A1* 8/2006 Gonikberg ............... 379/376.01

* cited by examiner

*Primary Examiner* — Melur Ramakrishnaiah
(74) *Attorney, Agent, or Firm* — Troy A. Van Aacken

(57) ABSTRACT

A fax-only setting identifies a value that is used as a counter of a timer. Upon initiating or receiving a call at an endpoint with which the fax-only MIB value is associated, a user device that provides the endpoint begins a timer based on the setting. During the timer period processing circuitry and/or software of the user device associated with the endpoint determines whether a tone generated/received by a call being initiated/received includes a data signal. If the device determines that such a data signal has been generated/received, a call corresponding to the data signal is processed. If the device does not determine that a data signal has been generated/received, the call being initiated or received at the endpoint is dropped.

17 Claims, 1 Drawing Sheet

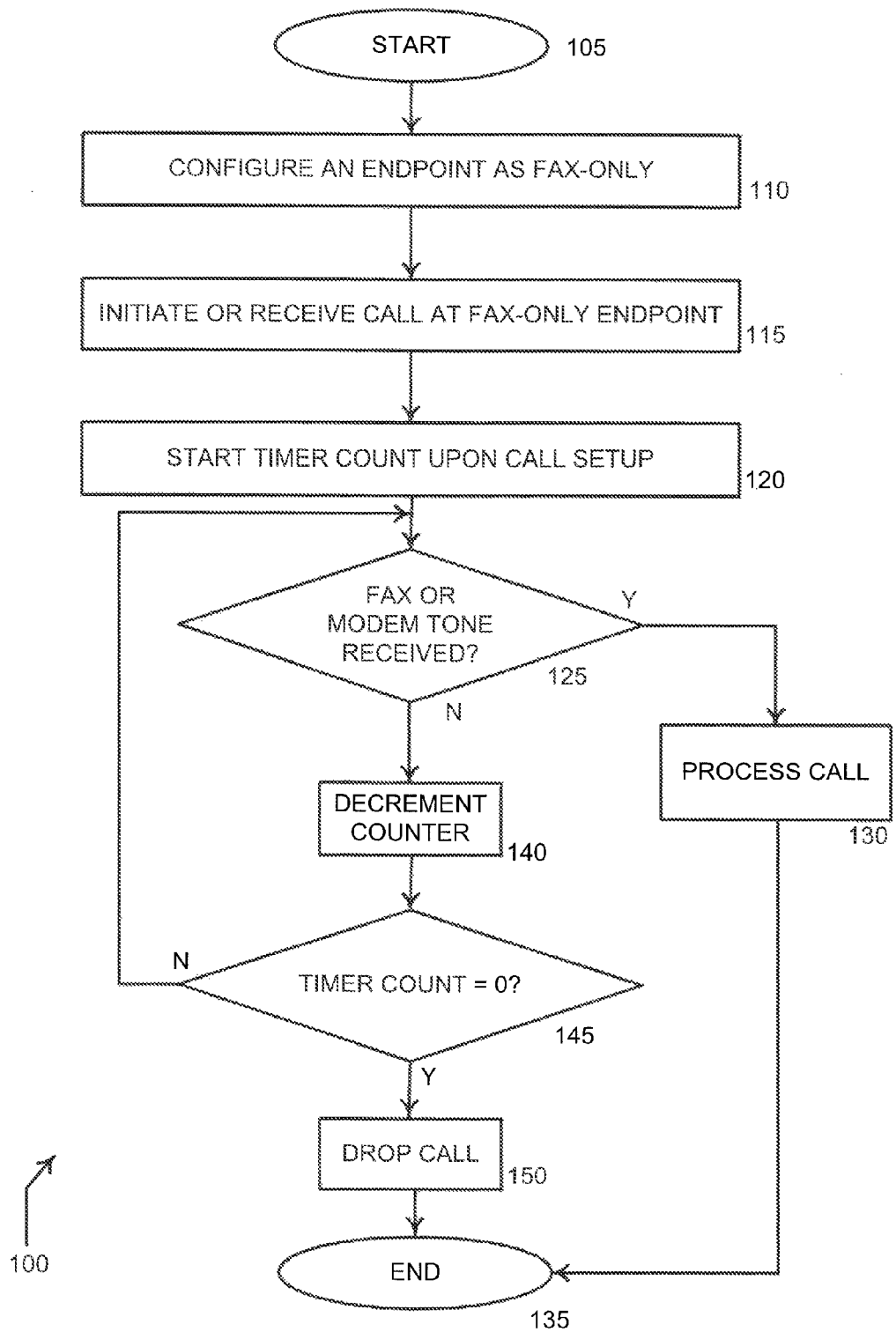

RESTRICTING USE OF AN ENDPOINT LINE TO FAX-ONLY

CROSS REFERENCE TO RELATED APPLICATION

This application is a continuation of U.S. patent application Ser. No. 11/961,898, entitled "Method of Restricting use of a PacketCable SIP or NCS E-MTA Line to Fax-Only," filed on Dec. 20, 2007, now issued as U.S. Pat. No. 8,223,934, which application claims priority under 35 U.S.C. 119(e) to U.S. provisional patent application No. 60/877,277 entitled "Method of restricting use of a PacketCable SIP or NCS E-MTA line to fax-only," filed Dec. 27, 2006, both of which are hereby incorporated herein by reference.

TECHNICAL FIELD

This disclosure relates, generally, to communication networks and, more particularly to the provisioning of an endpoint on a user communication device to support fax-only telephony calls.

BACKGROUND

Providers of telephony over IP networks may desire to increase revenue by providing more than one line (i.e., more than one telephone number) from corresponding multiple ports from a user device, such as a telephone modem that operates according to the PacketCable standard, for example. However, some customers may decide not to pay for more than one line to use for a fax machine, for example, due to cost. Therefore, there is a need in the art for a system and method for providing a lower cost line that supports facsimile transmissions (both send and receive operations) but does not support voice telephone calls.

BRIEF DESCRIPTION OF DRAWINGS

FIG. 1 illustrates a flow diagram of a method for providing a fax-only line from an E-MTA device.

DETAILED DESCRIPTION

As a preliminary matter, it readily will be understood by those persons skilled in the art that the present disclosure is susceptible of broad utility and application. Many methods, embodiments and adaptations of the present disclosure other than those herein described, as well as many variations, modifications, and equivalent arrangements, will be apparent from or reasonably suggested by the present disclosure and the following description thereof, without departing from the substance or scope of the present disclosure.

Accordingly, while this disclosure has been described herein in detail in relation to preferred embodiments, it is to be understood that this disclosure is only illustrative and exemplary of this disclosure and is made merely for the purposes of providing a full and enabling disclosure of the inventive concepts identified herein. The disclosure is not intended nor is to be construed to limit the present inventive concept or otherwise to exclude any such other embodiments, adaptations, variations, modifications and equivalent arrangements, the present application being limited only by the claims appended hereto and the equivalents thereof.

Turning now to the figures, FIG. 1 illustrates a flow diagram of a method 100 for facilitating a fax-only line on a communication device. The communication device may be a device having an E-MTA for providing telecommunication services over an Internet Protocol ("IP"), often referred to as voice over IP, or VoIP. Method 105 begins at step 105 and an endpoint is configured at the device at step 110. Step 110 may include using a management information base ("MIB") object under the Session Initiation Protocol ("SIP") MIB to configure the treatment of fax calls on a SIP endpoint. The SIP endpoint configured at step 110 may be a single endpoint or one of a plurality of endpoints coupled to an EMTA within a user device, such as, for example, a TOUCHSTONE® Telephony Modem as manufactured by ARRIS Group, Inc. A fax-only-configuration MIB that facilitates the endpoint supporting only fax calls is referred to as sipCfgPortFaxOnlyTimeout. Method 100 associates this fax-only-configuration MIB with a particular SIP endpoint to define a line coupled thereto as a fax-only line. Method 100 associates the fax-only MIB with the particular SIP endpoint according to input, perhaps from a user of the user device, from a manufacturer of the user device or from a service provider who delivers service via the user device. For purposes of discussion, the term endpoint refers to a logical port of a user device that is provisioned for transmitting and receiving telephony calls, and may or may not be associated with a specific physical port (e.g., RJ-11 jack) of the user device.

The default value of the fax-only-configuration MIB object may be initialized to zero, which may be defined to mean no timeout. After initiating or receiving a call at the endpoint at step 115, method 100 starts a timer, based on the value stored in the fax-only-configuration MIB, at step 120 if the fax-configuration MIB is set to a non-zero value. It will be appreciated that the MIB object is configured in units of seconds.

After the timer starts counting down, method 100 determines at step 125 whether the fax-only endpoint has detected either a fax or modem tone. It will be appreciated that a modem tone could be received from either an actual dial-up modem, for example, or from a fax modem device that is sending facsimile message transmission according to a facsimile protocol, such as, for example, T.30 and/or, T.38.

If the method 100 determines at step 125 that a fax or modem tone has been received at the fax-only endpoint, the EMTA (or MTA), or device which includes the EMTA that is executing method 100, processes the call at step 130. The processing at step 130 occurs even if the call is from a dial-up modem attempting to connect to the endpoint, even if there is not a computer coupled to the user device. Following processing at step 130, method 100 ends at step 135.

Returning to discussion of the determination at step 125, if method 100 determines that neither a fax nor modem tone has been received, the counter value is decremented at step 140. A determination is made at step 145 whether the timer count value has decremented to zero, or less than zero in the case where a user or operator initializes the fax-configuration MIB value as zero. If method 100 determines that the timer count value is greater than zero, the method returns to step 125 and determines whether a fax or modem tone has been received at the fax-only endpoint. If method 100 determines that the timer count value has decremented to zero (or less than zero), the method causes the user device at step 150 to drop the call that was received, or initiated, at step 115. Thus, if the call is/was a voice call, the user cannot initiate/accept the call on the fax-only line. After method 100 drops the call at step 150, the method ends at step 135.

What is claimed is:

1. One or more non-transitory computer readable media operable to be executed by a processor operating on a media terminal adapter, the computer readable media upon execution by the processor being operable to cause the media terminal adapter to perform operations, comprising:
configuring an endpoint associated with a line of a user device as fax-only;
receiving a call request at the endpoint;
setting up a call at the endpoint in response to the call request;
starting a timer upon setting up the call at the endpoint, the timer comprising a predetermined period based on a fax-only configuration setting;
determining whether a fax or modem tone is detected at the endpoint during the predetermined period; and
disconnecting the call if no fax or modem tone is detected during the predetermined period.

2. The computer readable media of claim 1, wherein the fax-only configuration value is stored in a management information base.

3. The computer readable media of claim 2, wherein settings in the management information base are based upon a configuration file retrieved during a ranging and registration process performed when the user device connects to a service operator network.

4. The computer readable media of claim 1, further comprising processing the call only if a fax or modem tone was detected during the predetermined period.

5. The computer readable media of claim 1, wherein the endpoint operates using network-based call signaling.

6. The computer readable media of claim 5, wherein the network-based call signaling comprises a session initiation protocol.

7. One or more non-transitory computer readable media operable to be executed by a processor operating on a media terminal adapter, the computer readable media upon execution by the processor being operable to cause the media terminal adapter to perform operations, comprising:
configuring an endpoint associated with a line of a user device as fax-only;
initiating a call from the endpoint;
starting a timer upon initiating the call from the endpoint, the timer comprising a predetermined period based on a fax-only configuration setting;
determining whether a fax or modem tone response is detected at the endpoint during the predetermined period; and
dropping the call if no fax or modem tone is detected during the predetermined period.

8. The computer readable media of claim 7, wherein the fax-only configuration value is stored in a management information base.

9. The computer readable media of claim 8, wherein settings in the management information base are based upon a configuration file retrieved during a ranging and registration process performed when the user device connects to a service operator network.

10. The computer readable media of claim 7, further comprising processing the call only if a fax or modem tone response was detected during the predetermined period.

11. The computer readable media of claim 7, wherein the endpoint operates using network-based call signaling.

12. The computer readable media of claim 11, wherein the network-based call signaling comprises a session initiation protocol.

13. A computer-implemented method for operating a line of a user device as fax-only, comprising:
configuring an endpoint that is associated with the line as computer data-only;
setting up a call at the endpoint, wherein the call may be an outgoing call being initiated or an incoming call being received;
starting a timer upon setting up the call at the endpoint, the timer comprising a predetermined period based on a computer data-only configuration setting;
determining whether a computer data signal is detected at the endpoint during the predetermined period; and
dropping the call if a computer data signal is not detected during the predetermined period.

14. The computer-implemented method of claim 13, wherein the computer data-only configuration value is stored in a management information base.

15. The computer implemented method of claim 14, wherein the management information base is based upon a configuration file retrieved during a ranging and registration process performed when the user device connects to a service operator network.

16. The computer implemented method of claim 13, further comprising processing the call only if a computer data signal was detected during the predetermined period.

17. The computer readable media of claim 13, wherein the computer data signal comprises a session initiation protocol signal.

* * * * *